United States Patent [19]

Seki et al.

[11] Patent Number: 5,063,517

[45] Date of Patent: Nov. 5, 1991

[54] PROFILE REVISING METHOD

[75] Inventors: Masaki Seki; Takashi Takegahara, both of Tokyo; Takeshi Arakaki, Yamanashi, all of Japan

[73] Assignee: Fanuc Ltd., Yamanashi, Japan

[21] Appl. No.: 397,453

[22] PCT Filed: Dec. 13, 1988

[86] PCT No.: PCT/JP88/01261

§ 371 Date: Aug. 14, 1989

§ 102(e) Date: Aug. 14, 1989

[87] PCT Pub. No.: WO89/06005

PCT Pub. Date: Jun. 29, 1989

[30] Foreign Application Priority Data

Dec. 17, 1987 [JP] Japan .................. 62-319389

[51] Int. Cl.$^5$ .................. G05B 19/18
[52] U.S. Cl. .................. 364/474.22; 364/474.26; 364/192
[58] Field of Search .................. 364/474.22, 474.23, 364/474.24, 474.25, 474.26, 474.27, 474.29, 191, 192

[56] References Cited

U.S. PATENT DOCUMENTS 4,901,220 2/1990 Matsumura et al. .................. 364/191
4,926,311 5/1990 Matsumura et al. .................. 364/191
4,939,635 7/1990 Seki et al. .................. 364/191

FOREIGN PATENT DOCUMENTS 8902619 9/1988 World Int. Prop. O. .

Primary Examiner—Jerry Smith
Assistant Examiner—Paul Gordon
Attorney, Agent, or Firm—Staas & Halsey

[57] ABSTRACT

When a figure element ($S_1$) of a profile ($A_0$) displayed on a CRT is revised to a figure element ($S_1'$), a processor causes a revised profile ($A_0'$) that does not include corner shapes ($E_1$, $E_2$) to be displayed on a display screen and subsequently inserts the corner shapes ($E_1$, $E_2$) in the revised profile ($A_0'$) in order one at a time. If an error is generated at this time, or in other words, if it becomes impossible to insert a corner shape, a message ($M_1$) relating to the dimensions of the corner shape ($E_1$) at which the error has occurred is displayed on the display screen CRT to make revision possible, and the corner shape ($E_1$) at which the error has occurred is displayed in a color different from that of the other portions of the profile. By revising the corner shape ($E_1$) at which the error occurred, the revised corner shape is inserted in the new profile ($A_0'$), which is displayed.

12 Claims, 8 Drawing Sheets

FIG. 2

| EXECUTION | POINT/POINT GROUP DEFINITION | | STRAIGHT LINE DEFINITION | | CIRCLE DEFINITION | | | SPECIAL SHAPE DEFINITION | |
|---|---|---|---|---|---|---|---|---|---|
| | 1 | | 2 | | 3a | 3b | 3c | 4 | |
| SHAPE DATA INPUT | . 1a | 1b | — 2a | \| 2b | ⊙ | ⊙ | ⊙ | ∽ | ⌐⌐ |
| NEW DEFINITION | ⊙ 1c | ▦ | 2d | / 2e | (r) | (r) | (r) | △ | □ |
| | ⌐⌐ | ⌐⌐ | 2g | // 2f | ○ | ○ | ○ | ⬠ | |
| INITIAL SETTING | ✦ | ⌬ | ✕ | ✕ | ⬡ | ⓡ | ⓡ | ✹ | |
| SHAPE GROUP SELECTION | ▦ | | REDEFI-NITION | | REDEFI-NITION | | | | |

| ELEMENT | | SHAPE | |
|---|---|---|---|
| 5 | | | |
| ERASE | | CREATE | ERASE |
| PARTIAL ERASE | 5a | ELEMENT REVISION | |

PROFILE REVISING METHOD

BACKGROUND OF THE INVENTION a. Field of the Invention

This invention relates to a method of revising a profile generated using figure definition statements in an automatic programming language, and more particularly, to a profile revising method for revising an already defined profile and for suitably revising a corner shape such as a chamfered or rounded shape contained in the profile.

b. Description of the Related Art

In an automatic programming system for creating NC data using an automatic programming language such as APT (automatic programming tools) or FAPT, (a) a part program based on the automatic programming language is created by defining points, straight lines and circular arcs using simple symbols (this is referred to as "figure definition"); defining a profile using the defined points, straight lines and circular arcs (referred to as "profile definition"); and then defining a tool path along the profile (referred to as "motion statement definition"), and (b) the part program based on the automatic programming language is subsequently converted into NC data comprising NC data (EIA codes or ISO codes) in a format capable of being executed by an NC unit.

For example, in order to define figure elements $S_1$–$S_4$ shown in FIG. 9 and subsequently insert rounded arcs of radii $r_1$, $r_2$ at a corner portion $CN_1$ of sides $S_2$, $S_3$ and a corner portion $CN_2$ of sides $S_3$, $S_4$, respectively, as shown in FIG. 10, to define a profile $A_0$, the following is entered using the defined figure element symbols $S_1$–$S_4$:

$S_1$ $S_2$, $r_1R$ $S_3$, $r_2R$ $S_4$ $S_1$

The alphabetic character "R" means that a rounded shape having a prescribed radius $r_i$ is inserted at a corner.

In order to insert chamfered portions having amounts of chamfer $c_1$, $c_2$ at corner portion $CN_1$ of sides $S_2$, $S_3$ and corner portion $CN_2$ of sides $S_3$, $S_4$, respectively, as shown in FIG. 11, to define a profile $A_1$ after the figure definition of FIG. 9 is made, the following is entered using the already defined figure element symbols:

$S_1$ $S_2$, $c_1C$ $S_3$, $c_2C$ $S_4$ $S_1$

The alphabetic character "C" means that a chamfered shape having a prescribed amount of chamfer $c_i$ is inserted at a corner.

More specifically, the already defined figure elements are arrayed in order along the profile. When rounding is to be performed, rR (r represents the radius) is disposed between the two straight-line symbols indicating the two straight lines where the rounding is to be inserted. When chamfering is to be performed, cC (c represents the amount of chamfer) is disposed between the two straight-line symbols indicating the two straight lines where the chamfer is to be inserted.

In a profile in which a chamfered or rounded corner portion has been inserted, there are cases where it is desired to revise a figure element other than that of a corner shape. Since the profile is changed by the revision in such case, a situation may arise in which an error is generated because the chamfered or rounded corner shape which until now could be inserted between sides of the profile can no longer be inserted.

For example, if the figure element $S_1$ of the profile $A_0$ defined in FIG. 10 is revised to the figure element $S_1'$ shown in FIG. 12, the rounding arc of radius $r_1$ cannot be inserted at the corner portion $CN_1$ between the sides $S_2$, $S_3$ merely by a revising operation in which the figure element $S_1$ is replaced by the figure element $S_1'$. In other words, the rounding arc of radius $r_1$ cannot be inserted at the corner portion $CN_1$ so as to contact the sides $S_2$, $S_3$. An error is generated as a result.

In the prior art, however, the location at which the error will occur cannot be determined from the profile definition statements on the revision display screen. As a result, the operator is constrained to check, by repeated computations, whether an error has occurred at rounding between sides, and to subsequently revise the rounding radius at the location of the error. As a consequence, checking error locations consumed large amounts of time. Though the foregoing relates to rounded corner portions, the same holds true at chamfered corner portions.

Further, the revision screen and an execution screen displaying the profile are separate screens in the prior art. Therefore, when an error occurs, a revision must be carried out by switching back and forth between the execution screen and the revision screen. This is a troublesome task.

Accordingly, an object of the present invention is to provide a profile revising method in which revision of a profile can be executed without being aware of the presence of chamfered or rounded corner shapes, in which the location of an error can be clarified when an error occurs due to a revision, and in which revision of a profile and display of the profile can be performed on the same screen.

SUMMARY OF THE INVENTION

The present invention provides a profile revising method for revising a profile in which a corner shape such as a chamfered shape or rounded shape (circular arc) or the like has been inserted. In the profile revising method, a figure element other than those of corner shapes is revised and the revised profile, which does not include the corner shapes, is displayed. Thereafter, if an error is generated when the corner shapes are inserted in the revised profile one at a time, the dimensions of the corner portion at which the error occurred are displayed on a display screen to make revision possible. Also, the corner shape at which the error occurred is displayed in a color different from that of the other portions of the profile. By revising the corner shape at which the error occurred, the revised corner shape is inserted in the new profile, which is displayed.

BRIEF DESCRIPTION OF THE DRAWINGS

FIG. 2 is a view for describing the principal portion of a menu chart;

DESCRIPTION OF THE PREFERRED EMBODIMENTS

Figure 1:
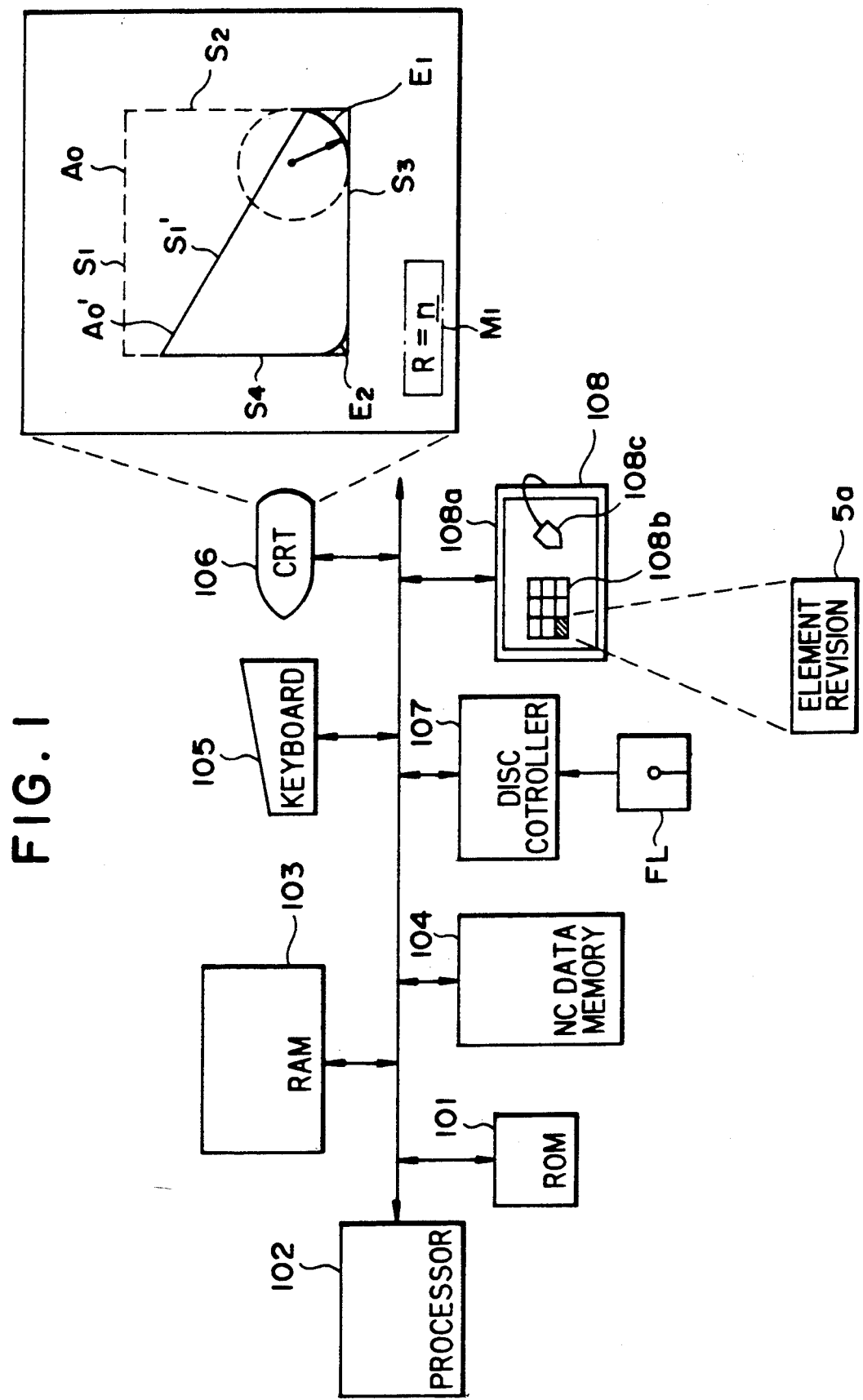
FIG. 1 is a block diagram of an apparatus for practicing the present invention.

FIG. 1 is a block diagram of an apparatus for practicing the present invention.

Reference numeral 101 denotes a ROM storing a loading program and the like, 102 denotes a processor for executing automatic programming processing, and 103 a RAM for storing a system program read in from a floppy FL, as well as various parameters and results of processing. Reference numeral 104 denotes an NC data memory for storing the finally created NC data having an executable format, 105 denotes a keyboard, 106 denotes a display unit (CRT), 107 denotes a disc controller, and 108 denotes a tablet device having a tablet surface 108a to which a menu chart 108b having menu items is affixed. Prescribed menu items are picked by a tablet cursor 108c. FL represents a floppy disc.

FIG. 2 is a view for describing the principal parts of the menu chart 108b. Numeral 1 is a "POINT/POINT GROUP DEFINITION" section, 2 a "STRAIGHT LINE DEFINITION" section, 3 a "CIRCLE DEFINITION" section, 4 a "SPECIAL SHAPE DEFINITION" section and 5 a "SHAPE MODIFICATION" section. The "SHAPE MODIFICATION" section 5 is provided with an "ELEMENT REVISION" section 5a indicating an item for revising a figure element.

$A_0$, appearing on the CRT 106 illustrated in FIG. 1, represents a profile, prior to revision, composed of the already defined figure elements $S_1$–$S_4$. $A_0'$ represents the profile after the figure element $S_1$ is revised to $S_1'$ in profile $A_0$. $E_1$, $E_2$ represent corner shapes having rounded configurations (circular arcs), and $M_1$ denotes a message.

When the figure element $S_1$ of the profile $A_0$ displayed on the display screen is revised to the figure element $S_1'$, the processor 102 causes the revised profile $A_0$, which does not include the corner shapes $E_1$, $E_2$, to be displayed on the CRT, and subsequently inserts the corner shapes $E_1$, $E_2$ into the revised profile $A_0'$ in order one at a time. If an error is generated at this time, or in other words, if it becomes impossible to insert a corner shape, the message $M_1$ relating to the dimensions of the corner shape (e.g., $E_1$) at which the error has occurred is displayed on the display screen CRT to make revision possible, and the corner shape at which the error has occurred is painted in a color different from that of the other portions of the profile. By revising the corner shape $E_1$ at which the error occurred, the revised corner shape is inserted in the new profile $A_0'$, which is displayed.

Figure 3:
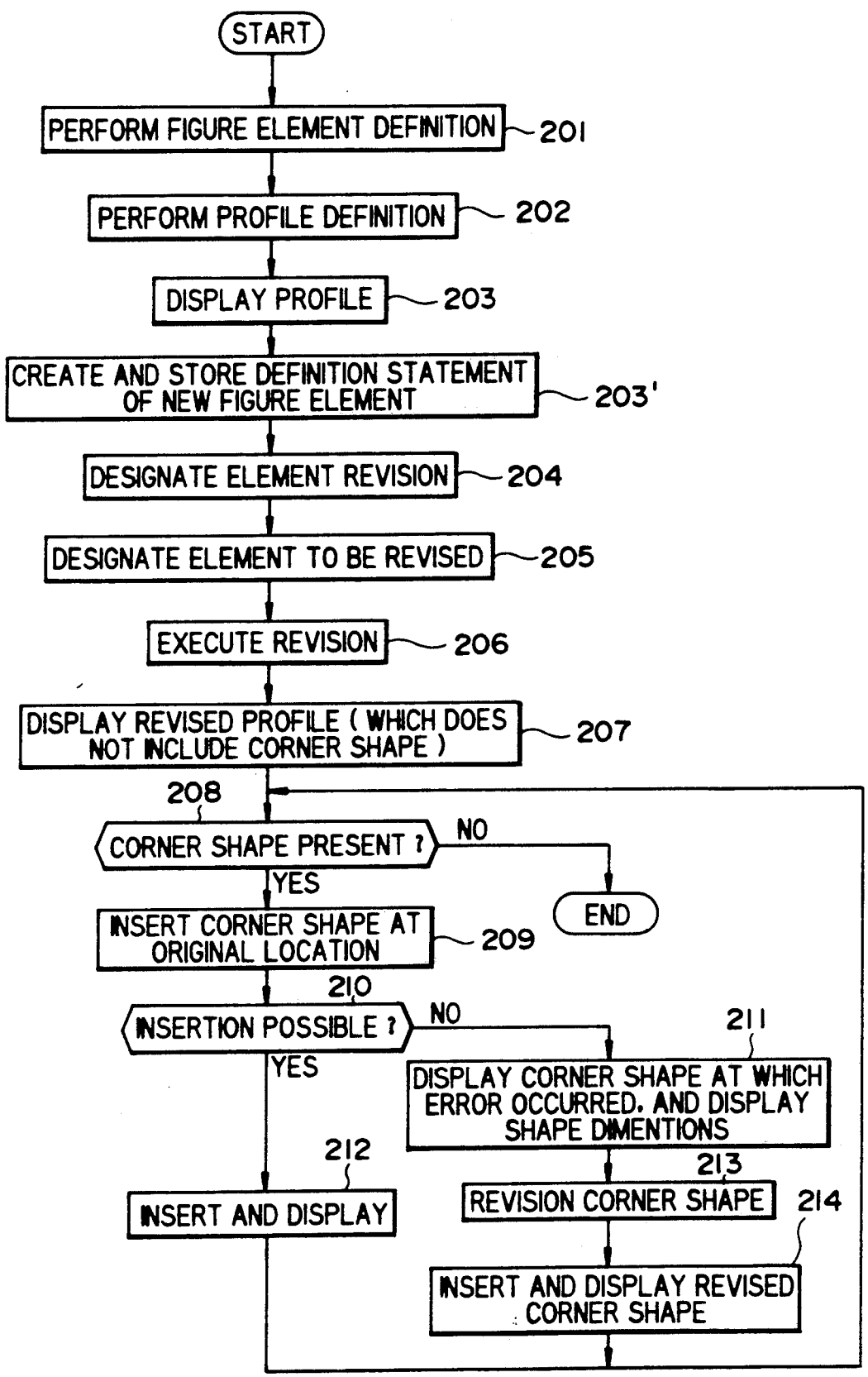
FIG. 3 is a flowchart of profile revising processing according to the invention.

FIG. 3 is a flowchart of profile revising processing according to the invention, and FIGS. 4 through 8 are views for describing the profile revising processing of the invention. The method of the present invention will now be described in accordance with these figures. A system program, parameters and the like for forming an NC part program have already been stored in the RAM 103 from the floppy disk FL.

Figure 4:
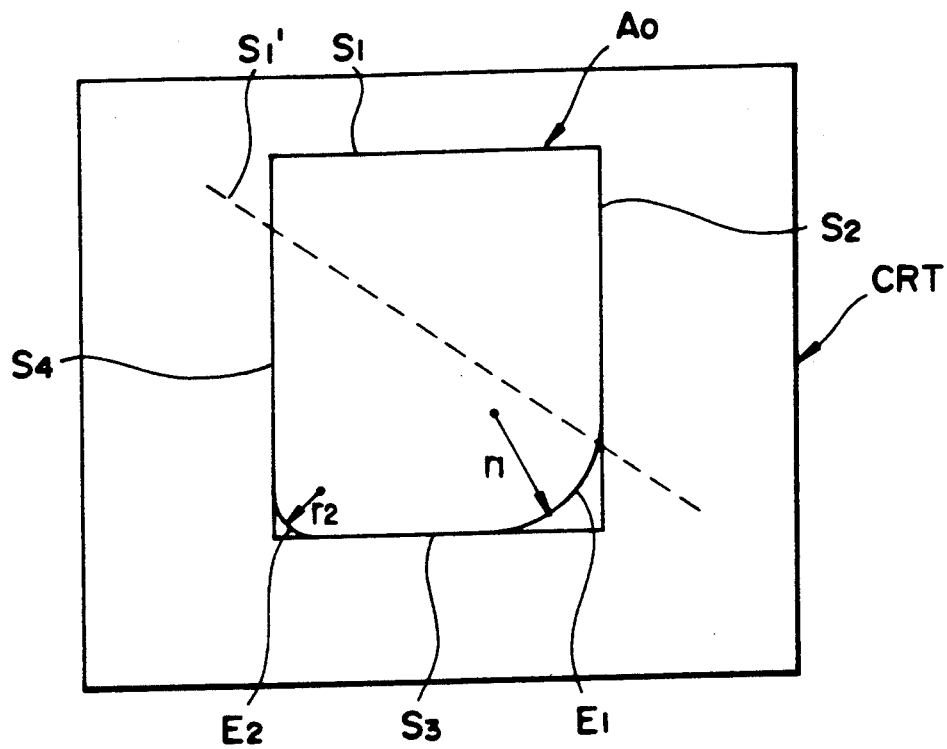
FIGS. 4, 5, 6(a) and 6(b) are views for describing the profile revising processing of the invention in a case where a corner shape is a circular arc.
Figure 10:
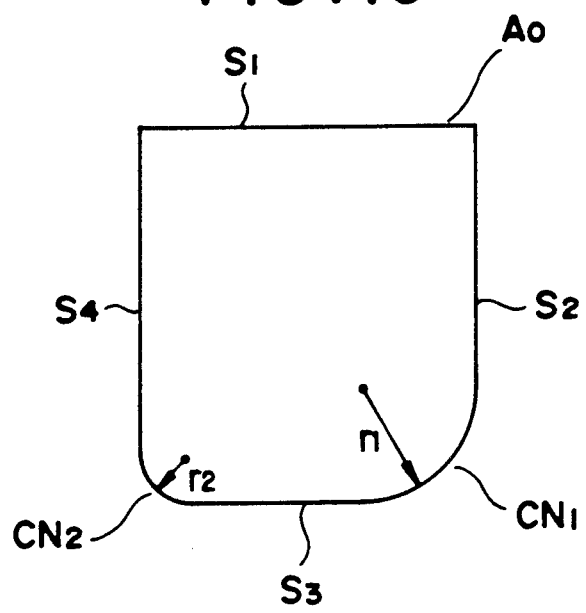
Figure 11:
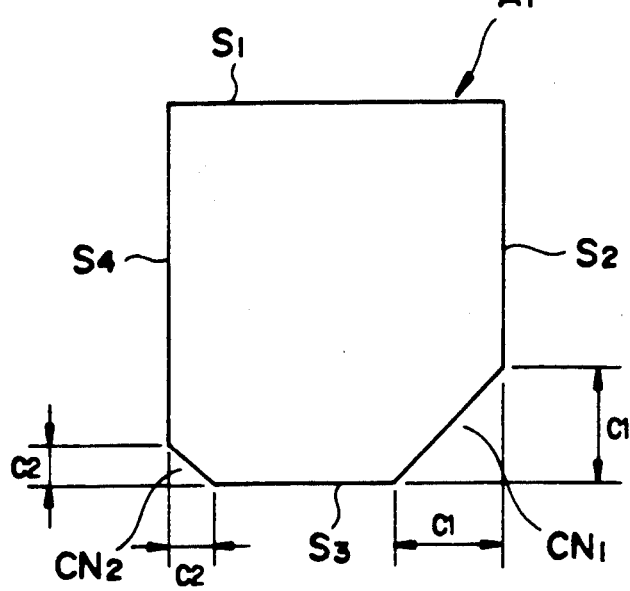
Figure 12:
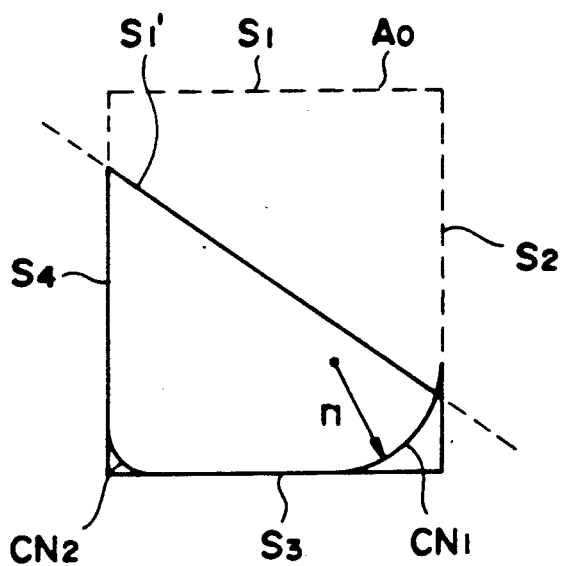

First, the straight-line elements $S_1$–$S_4$ shown in FIG. 4 are defined using the tablet device 108 and keyboard 105 (step 201), then rounding of radii $r_1$, $r_2$ is inserted to define the profile $A_0$ (step 202). The definition statements of the profile are as follows, just as described in relation to FIG. 10:

$S_1$ $S_2, r_1R$ $S_3, r_2R$ $S_4$ $S_1$

The defined profile is stored in the RAM 103 and displayed on the CRT 106 (step 203).

Under these conditions, it is assumed that the operator wishes to redefine the straight line $S_1$ of the profile $A_0$ displayed on the CRT 106. Hence, the straight line $S_1'$ (FIG. 4) indicated by the dashed line is defined and stored in the RAM 103 (step 203').

Next, the "ELEMENT REVISION" item 5a is selected from the tablet menu chart 108b, the straight line $S_1$ to be revised is selected, and then revision execution is designated to revise the straight line $S_1$ to the straight line $S_1'$ (steps 204–206).

Figure 5:
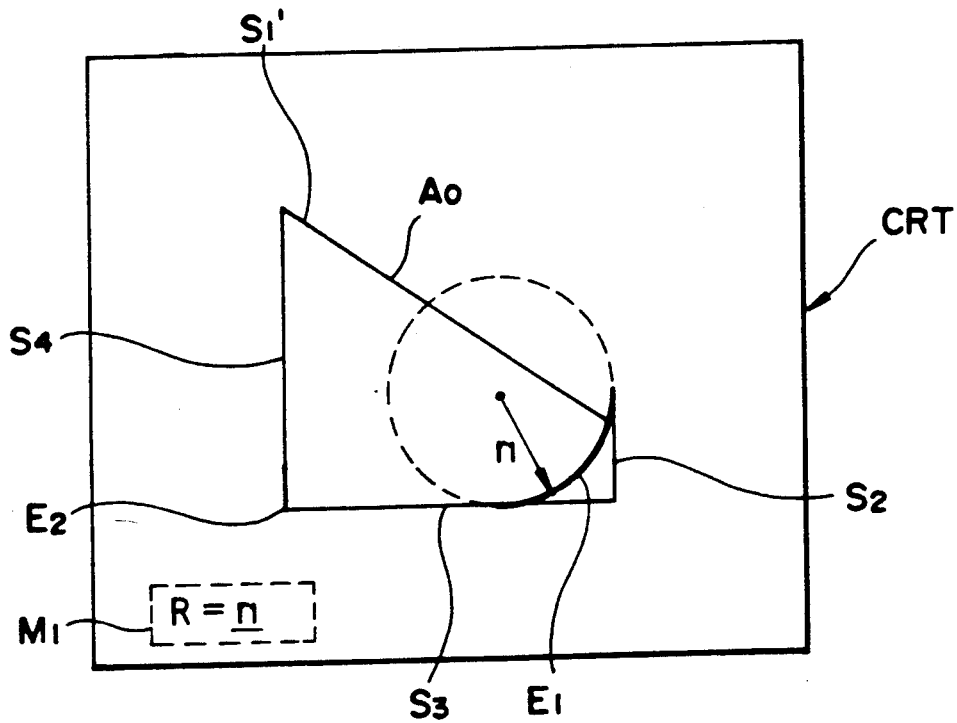
Figure 6A:
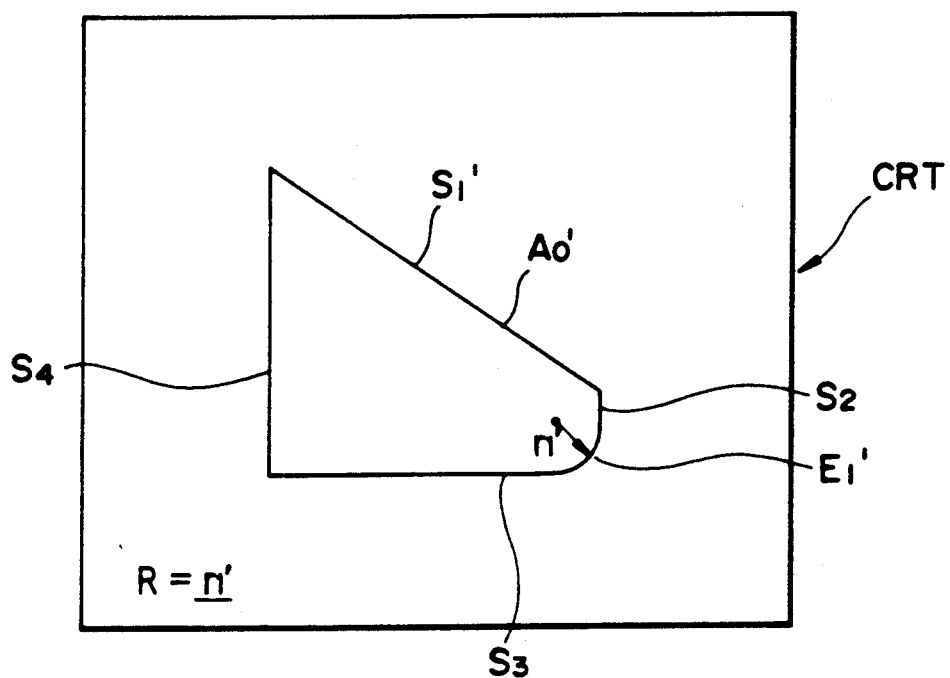
Figure 6B:
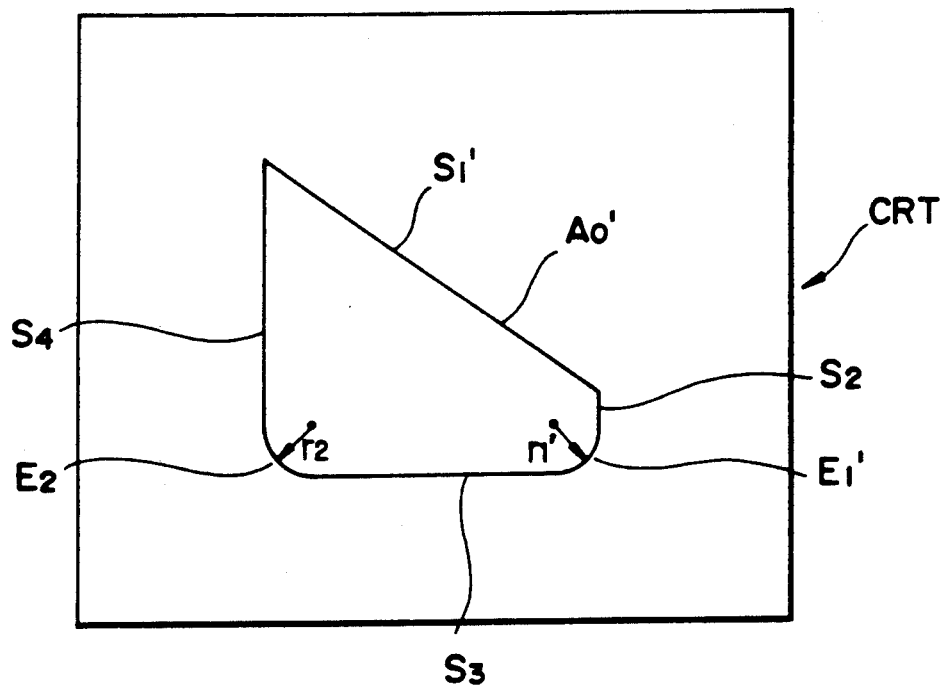

The processor 102 causes the revised profile (which does not include the rounded or chamfered corner shape) $A_0'$ inclusive of the revised straight line $S_1'$ to be displayed on the CRT 106 (step 207; see FIG. 5).

Thereafter, a check is made to see if a corner shape is present (step 208). If a corner shape is present, the corner shape is inserted at the original location (step 209). In the example, the first corner shape $E_1$, which is a circular arc of radius $r_1$, is inserted at the original location, namely between the line segments $S_1$ and $S_2$.

As a result of the insertion, the circular arc does not contact the two sides $S_2$, $S_3$ simultaneously, so that an error is produced. The processor 102 causes the circular arc of the corner shape $E_1$ to be displayed in a color (or bold line) different from the color of the other portions of the profile, as shown in FIG. 5, and causes the message $M_1$ having the arc dimension $r_1$ of the corner shape $E_1$ to be displayed (steps 210, 211).

If insertion of the corner shape is possible, the corner shape is inserted in the profile and displayed (step 212).

When an error occurs and the message $M_1$ is displayed, the operator manipulates the keyboard 105 to key in the new arc radius $r_1'$ (step 213). By entering the arc radius $r_1'$, the processor 102 inserts the circular arc (corner shape $E_1'$) of radius $r_1'$ between the straight lines $S_1$, $S_2$, and causes the shape to be displayed in the same color as the other portions of the profile [step 214; see FIG. 6(a)]. The program jumps to step 208.

If another corner shape is present, the processor 102 repeats the processing from step 209 onward. Since the other corner shape $E_2$ is present in the example, the processor inserts the corner shape, namely the circular arc of radius $r_2$, between the straight lines $S_3$, $S_4$, which is the original location [step 209; see FIG. 6(b)]. In this case, the circular arc contacts the two sides $S_3$, $S_4$ simultaneously. Therefore, no error is generated (step 210) and the profile having the inserted circular arc is displayed. Thereafter, the foregoing processing is repeated until all corner shapes are inserted. When insertion of all corner shapes is completed, a "NO" answer is received at step 208, so that profile revision processing is terminated. In the example, the profile definition statements are revised to the following:

$S_1'$ $S_2$, $\underline{r_1R}$ $S_3$, $\underline{r_2R}$ $S_4$ $S_1'$

Figure 7:
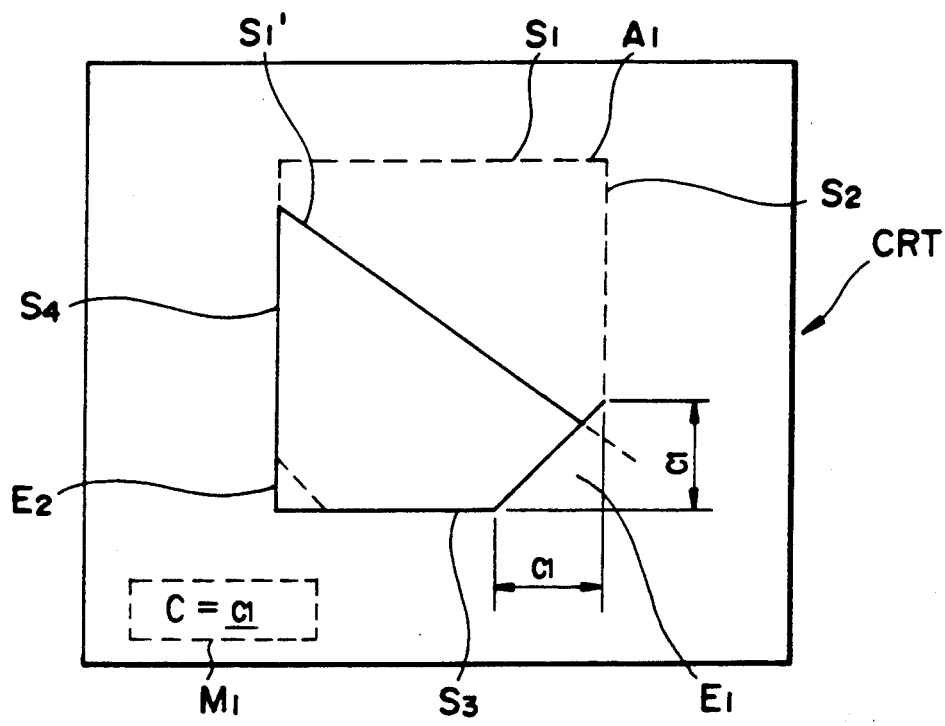
FIGS. 7 and 8 are views for describing the profile revising processing of the invention in a case where a corner shape is a chamfered shape.
Figure 8:
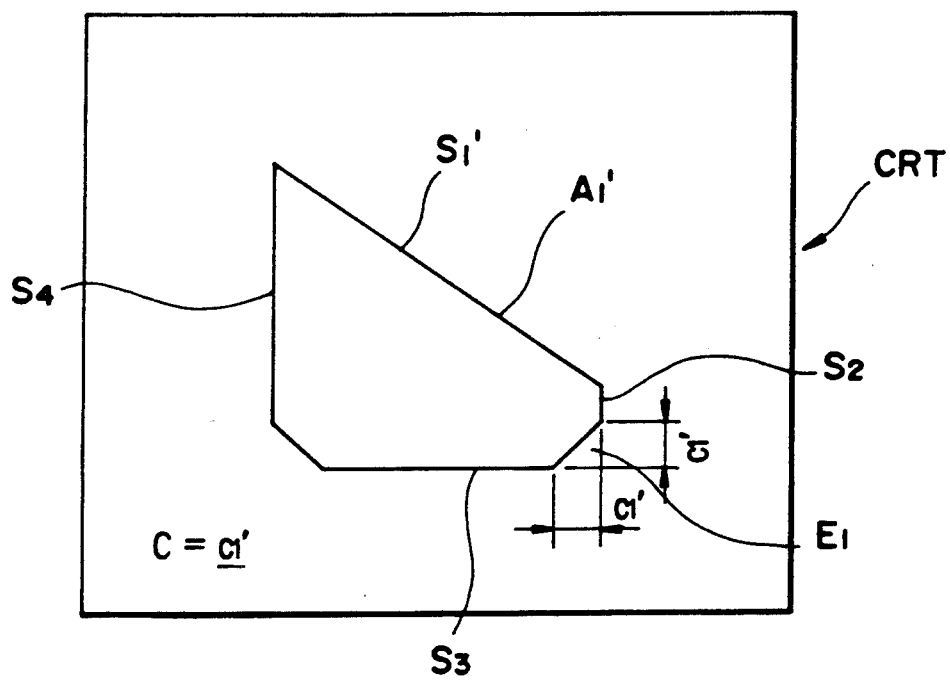
Figure 9:
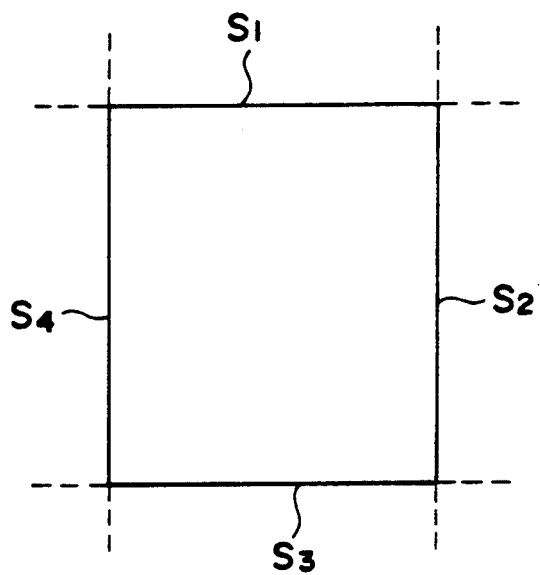
FIGS. 9 through 12 are views for describing a method according to the prior art.

The foregoing relates to processing in a case where a corner shape is rounded (a circular arc). However, operation is the same with regard to processing in a case where the corner has a chamfered shape. That is, as shown in FIG. 7, straight lines $S_1$–$S_4$ are defined, then profile $A_1$ is defined having the inserted corner shape, which is a chamfer. Thereafter, straight line $S_1$ in the profile $A_1$ is revised to the new straight line $S_1'$. Owing to the revision, insertion of the corner shape $E_1$ between the straight lines $S_1$, $S_2$ becomes impossible and an error is produced. As a result, the processor 102 causes the CRT 106 to display the message $M_1$ inclusive of the chamfer dimension $c_1$ of corner shape $E_1$ and to paint the corner shape $E_1$ in a color different from that of the other portions of the profile. When the dimension $c_1'$ of the new chamfer is entered, the processor inserts the corner shape having the revised chamfer dimension in the, profile $A_1'$ and displays the profile as shown in FIG. 8.

In a case where the chamfer amount c of the chamfered shape is greater than the length of one of the line segments forming the corner at which the chamfer shape is inserted, insertion of the chamfered shape is impossible and an error is produced.

The present invention is applicable also in cases where arcuate and chamfered shapes are mixed as the corner shapes.

In accordance with the present invention as described above, the arrangement is such that a figure element other than those of corner shapes is revised and the revised profile, which does not include the corner shapes, is displayed. Thereafter, if insertion becomes impossible and an error is generated when the corner shapes are inserted in the revised profile one at a time, the dimensions of the corner portion at which the error occurred are displayed on a display screen to make revision possible. Also, the corner shape at which the error occurred is displayed in a color different from that of the other portions of the profile. By revising the corner shape at which the error occurred, the revised corner shape is inserted in the new profile, which is displayed. Accordingly, revision of a profile can be executed without one being aware of the presence of chamfered or rounded corner shapes, the location of an error can be clarified automatically even when an error occurs, and revision of a profile and display of the profile can be performed on the same screen. This makes it possible to facilitate the revision operation.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

What is claimed is:

1. A profile revising method for revising a profile having figure elements, the profile defines a corner shape having a chamfered shape, rounded shape or the like, said method comprising the steps of:
    (a) displaying, on a display screen, a revised profile which does not include the corner shape when the figure elements other than those corresponding to the corner shape are revised;
    (b) checking whether insertion is possible when the corner shape is inserted into the revised profile and generating an error if insertion is not possible;
    (c) displaying dimensions of the corner shape where the error occurred on the display screen and painting the corner shape where the error occurred in a color different from that of other portions of the profile when the error is generated in step (b);
    (d) inserting, when the corner shape where the error occurred is revised, a revised corner shape into the revised profile and displaying the same.

2. A profile revising method according to claim 1, wherein in a case where the corner shape is a circular arc, insertion of the corner shape is judged to be impossible when the circular arc does not simultaneously contact two line segments forming the corner.

3. A profile revising method according to claim 1, wherein in a case where the corner shape is a chamfered shape, insertion of the corner shape is judged to be impossible when an amount of the chamfer is greater than a length of one of two line segments forming the corner.

4. A method for revising a profile having a corner shape, said method comprising the steps of:
    (a) indicating revisions of the profile to produce a revised profile;
    (b) displaying the revised profile without the corner shape;
    (c) determining whether insertion of the corner shape into the revised profile is possible;
    (d) inserting the corner shape into the revised profile when step (c) determines that insertion is possible; and
    (e) distinguishably displaying the corner shape when step (c) determines that insertion is not possible.

5. A method according to claim 4, wherein said method further comprises the steps of:
    (f) revising the corner shape to produce a revised corner shape when step (c) determines that insertion of the corner shape is not possible; and
    (g) inserting the revised corner shape into the revised profile.

6. A method according to claim 4, wherein the corner shape is one of a chamfered shape and a rounded shape.

7. A method according to claim 4, wherein the corner shape is a rounded shape formed by a rounded portion contacting each of two line segments of the corner shape, and wherein said determining in step (c) comprises the steps of:

(c1) determining whether the rounded portion simultaneously contacts the two line segments of the corner shape; and (c2) determining whether insertion of the corner shape into the revised profile is possible based on said determining is step (c1).

8. A method according to claim 4, wherein the corner shape is a chamfered shape formed by a chamfered portion having a chamfered amount and two line segments of the corner shape, each of the line segments having a length, and wherein said determining in step (c) comprises the steps of:

(c1) determining whether the chamfered amount is greater than the length of at least one of the two line segments of the corner shape; and (c2) determining whether insertion of the corner shape into the revised profile is possible based on said determining is step (c1).

9. A profile revising system for revising a profile having a corner shape, comprising:

display means for displaying the profile;

input means for indicating a revision of the profile;

control means for receiving the revision from said input means, for producing a revised profile based on the revision, for controlling display of the revised profile without the corner shape on said display means, and for determining whether insertion of the corner shape into the revised profile is possible.

10. A system according to claim 9, wherein said control means further inserts the corner shape into the revised profile if insertion is determined to be possible.

11. A system according to claim 10, wherein said control means further controls distinguishably displaying of the corner shape on said display means when insertion is not possible.

12. A system according to claim 11, wherein said control means further controls revising the corner shape to produce a revised corner shape when insertion is not possible and inserting the revised corner shape into the revised profile.

* * * * *